United States Patent
Leary et al.

(10) Patent No.: US 10,646,959 B2
(45) Date of Patent: May 12, 2020

(54) ADDITIVE MANUFACTURED COMPONENTS INCLUDING SACRIFICAL CAPS AND METHODS OF FORMING SAME

(71) Applicant: General Electric Company, Schenectady, NY (US)

(72) Inventors: Brendon James Leary, Simpsonville, SC (US); Thomas Etter, Muhen (CH); Felix Martin Gerhard Roerig, Baden (CH); Julius Andreas Schurb, Zurich (CH)

(73) Assignee: General Electric Company, Schenectady, NY (US)

(*) Notice: Subject to any disclaimer, the term of this patent is extended or adjusted under 35 U.S.C. 154(b) by 253 days.

(21) Appl. No.: 15/680,741

(22) Filed: Aug. 18, 2017

(65) Prior Publication Data
US 2019/0054568 A1   Feb. 21, 2019

(51) Int. Cl.
| | |
|---|---|
| B33Y 80/00 | (2015.01) |
| B33Y 10/00 | (2015.01) |
| B23K 26/342 | (2014.01) |
| B24C 1/10 | (2006.01) |
| B33Y 99/00 | (2015.01) |

(52) U.S. Cl.
CPC .......... B23K 26/342 (2015.10); B24C 1/10 (2013.01); B33Y 10/00 (2014.12); B33Y 80/00 (2014.12); B33Y 99/00 (2014.12)

(58) Field of Classification Search
None
See application file for complete search history.

(56) References Cited

U.S. PATENT DOCUMENTS

| | | | | |
|---|---|---|---|---|
| 4,268,850 A | * | 5/1981 | Lazarek | F28F 3/12 165/80.4 |
| 7,261,550 B2 | * | 8/2007 | Herzog | B22F 3/1055 425/547 |
| 7,413,001 B2 | * | 8/2008 | Wang | B22C 9/10 164/516 |
| 2008/0145234 A1 | * | 6/2008 | Lee | B22C 9/103 416/96 R |
| 2014/0199175 A1 | | 7/2014 | Godfrey et al. | |
| 2016/0332259 A1 | | 11/2016 | Jones et al. | |
| 2017/0197359 A1 | * | 7/2017 | Yang | B28B 1/14 |

* cited by examiner

*Primary Examiner* — Adam Krupicka
(74) *Attorney, Agent, or Firm* — James Pemrick; Hoffman Warnick LLC

(57) ABSTRACT

Additive manufactured components including sacrificial caps, and methods of forming components including sacrificial caps are disclosed. The additive manufactured components may include a body portion including a first surface, and a feature formed in the body portion. The feature may include an aperture formed through the first surface of the body portion. Additionally, the components may include a sacrificial cap formed integral with at least a portion of the first surface of the body portion. The sacrificial cap may include a conduit in fluid communication with the feature. The sacrificial cap including the conduit may be removed from the body portion to expose the first surface and the aperture of the feature, respectively, after performing one or more post-build processes, such as shot peening, on the component and the sacrificial cap.

13 Claims, 12 Drawing Sheets

ADDITIVE MANUFACTURED COMPONENTS INCLUDING SACRIFICAL CAPS AND METHODS OF FORMING SAME

BACKGROUND OF THE INVENTION

The disclosure relates generally to additive manufactured components, and more particularly, to additive manufactured components including sacrificial caps, and methods of forming components including sacrificial caps.

Components or parts for various machines and mechanical systems may be built using additive manufacturing systems. Additive manufacturing systems may build such components by continuously layering powder material in predetermined areas and performing a material transformation process, such as sintering or melting, on the powder material. The material transformation process may alter the physical state of the powder material from a granular composition to a solid material to build the component. The components built using the additive manufacturing systems have nearly identical physical attributes as conventional components typically made by performing machining processes (e.g., material removal processes) on stock material. However, because of the advantageous process, the components formed using additive manufacturing may include unique features and/or complex geometries that are difficult or impossible to obtain and/or build using conventional machining processes.

However, the capability of being able to easily form unique features and/or complex geometries results in new and/or additional manufacturing difficulties or issues. Specifically, the entire component formed using additive manufacturing may experience high tensile residual stress during the build process and/or during post-build process (e.g., machining, surface treatment, heat treatment, and the like). Additionally, unique features, such as channels formed through components, complex geometries, such as intricate curvatures in components, and/or thin walled sections, such as a section of the component formed between a channel and an exterior surface, may increase the high tensile residual stresses in specific portions of the component during the build process and/or during post-build processes. For example, during a shot peening process or a recrystallization process, the unique features and/or complex geometries formed in the component, and the exposed surface of the component surrounding the unique features and/or complex geometries, may increase the high tensile residual stress experienced by the component. The experienced high tensile residual stress may exceed the strength of the material used to form the component, and as a result, defects may be formed in the component. That is, defects (e.g., cracks, material deformation, material degradation, etc.) may form in the component during post-processing as a result of the high tensile residual stress experienced by the unique features and/or complex geometries, and surface of the component surrounding the unique features and/or complex geometries. Defects formed in the component can ultimately reduce the operational performance and/or the operational-life of the component, require undesirable maintenance, and/or necessitate complete component replacement.

BRIEF DESCRIPTION OF THE INVENTION

A first aspect of the disclosure provides an additive manufactured component. The component includes: a body portion including a first surface; a feature formed in the body portion, the feature including an aperture formed through the first surface of the body portion; and a sacrificial cap formed integral with at least a portion of the first surface of the body portion, the sacrificial cap including a conduit in fluid communication with the feature, wherein the sacrificial cap including the conduit is removed from the body portion to expose the first surface and the aperture of the feature.

A second aspect of the disclosure provides an additive manufactured component. The component includes: a body portion; a plurality of channels formed in the body portion, each of the plurality of channels including: a first aperture formed through a first surface of the body portion; and a second aperture formed through one of the first surface or a second surface of the body portion; and a sacrificial cap formed integral with at least a portion of the first surface of the body portion, the sacrificial cap including one of: a plurality of conduits, each of the plurality of conduits in fluid communication with a corresponding channel of the plurality of channels, or a manifold in fluid communication with each of the plurality of channels, wherein the sacrificial cap is removed from the body portion to expose the first surface and the aperture of each of the plurality of channels.

A third aspect of the disclosure provides a method of forming a component using an additive manufacturing system. The method includes: building a body portion of the component directly on a build plate, the body portion including: a feature formed in the body portion, the feature including an aperture formed through a surface of the body portion; building a sacrificial cap directly on and integral with the surface of the body portion of the component, the sacrificial cap including a conduit in fluid communication with the feature; performing at least one post-build process on the component and the sacrificial cap; and removing the sacrificial cap from the body portion of the component to expose the surface of the body portion and the aperture of the feature.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
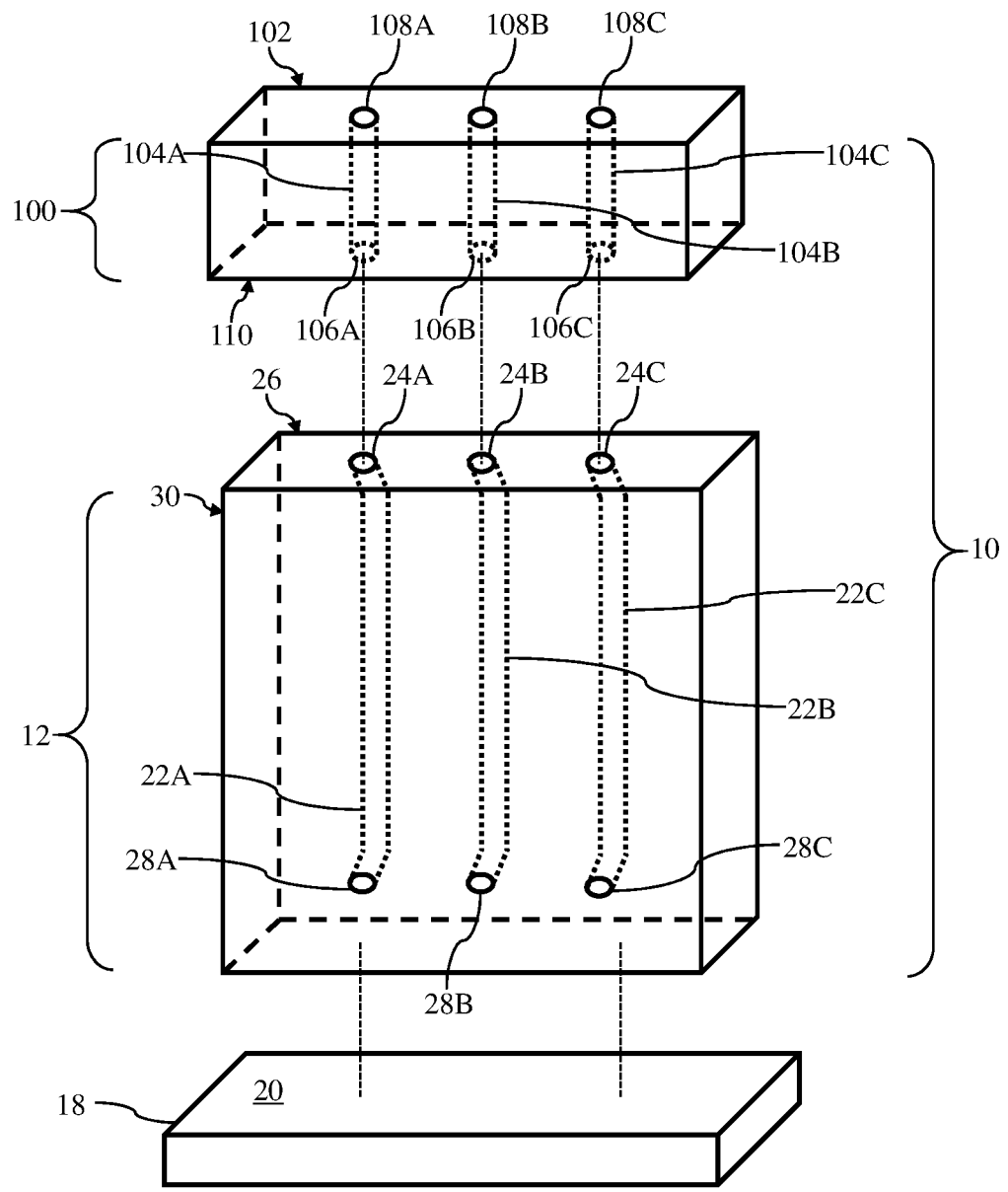
FIG. 1 shows an exploded, perspective view of a component including a sacrificial cap formed on a build plate of an additive manufacturing system, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

The following disclosure relates generally to additive manufactured components, and more particularly, to additive manufactured components including sacrificial caps, and methods of forming components including sacrificial caps.

These and other embodiments are discussed below with reference to FIGS. 1-12. However, those skilled in the art will readily appreciate that the detailed description given herein with respect to these Figures is for explanatory purposes only and should not be construed as limiting.

Figure 2:
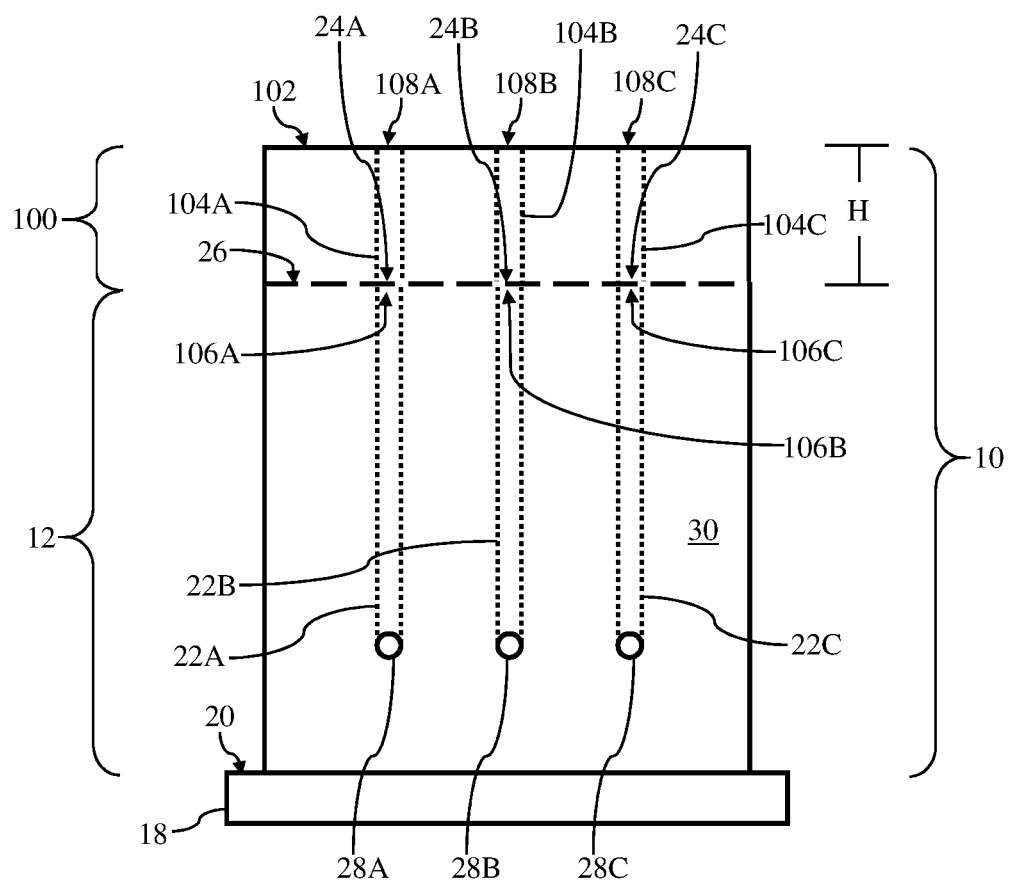
FIG. 2 shows a front view of the component including the sacrificial cap and the build plate of FIG. 1, according to embodiments of the disclosure.
Figure 12:
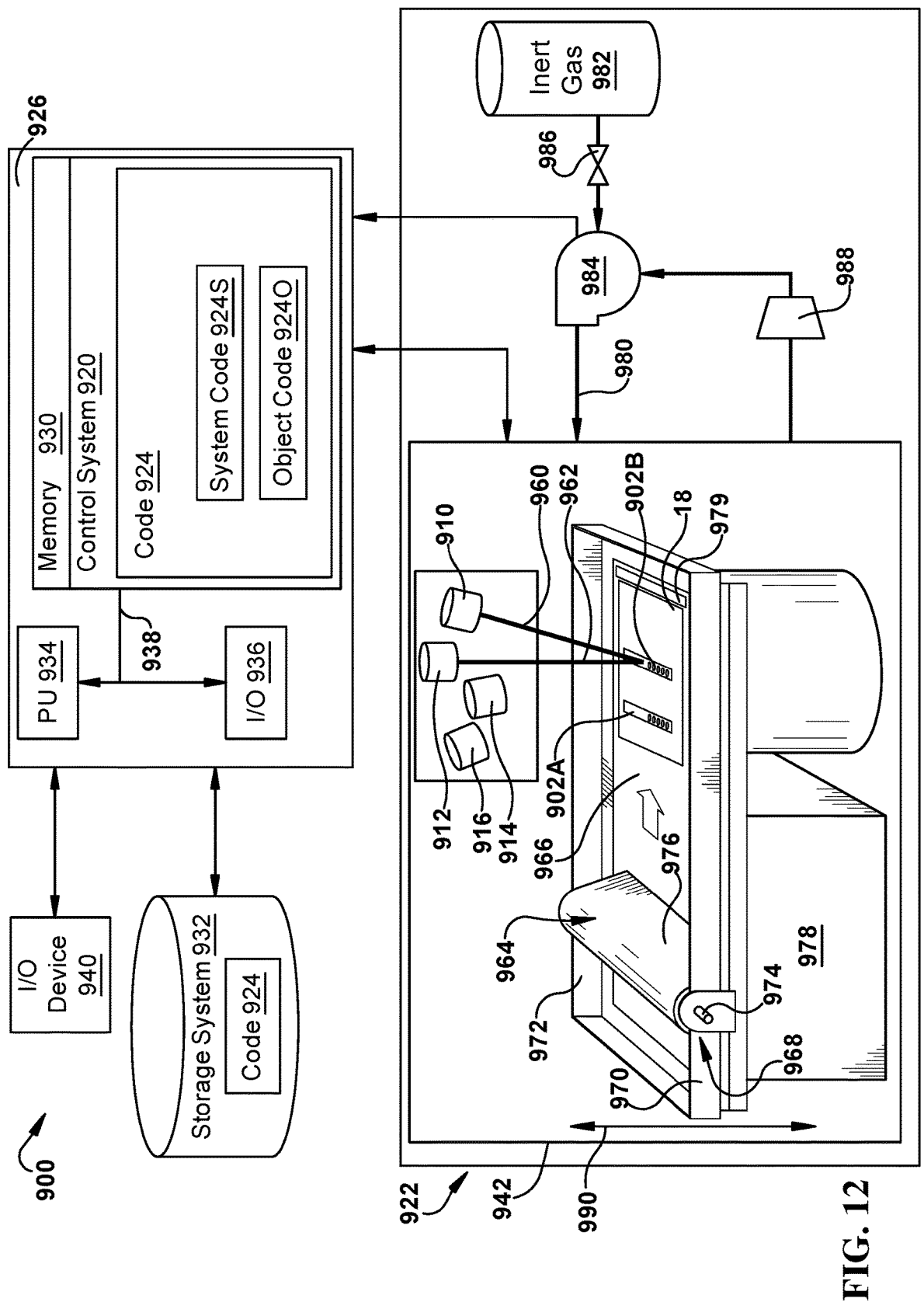
FIG. 12 shows a block diagram of an additive manufacturing system and process including a non-transitory computer readable storage medium storing code representative of a component including a sacrificial cap, according to embodiments of the disclosure.

FIGS. 1 and 2 shows various views of a component including a sacrificial cap built by an additive manufacturing system (AMS) (see, FIG. 12). Specifically, FIG. 1 shows a perspective, exploded view of component 10 including sacrificial cap 100, and FIG. 2 shows a front view of component 10 including sacrificial cap 100. Component 10 including sacrificial cap 100 may be considered an "intermediately" formed component and/or a component that may be in an intermediate stage of processing. As such, and as discussed herein, component 10 may undergo additional post-build processes performed before and/or after the final configuration of component 10 (e.g., a body portion) may be utilized for its intended purpose.

Component 10 may be formed by undergoing additive manufacturing process(es) using the AMS discussed herein (see, FIG. 12). In a non-limiting example, and as discussed herein, component 10, and its various portions including a body portion 12 and sacrificial cap 100, may be formed by performing a direct metal laser metaling (DMLM) process using powdered material. As shown in FIGS. 1 and 2, body portion 12 of component 10 may be built on build plate 18 of the AMS. That is, build plate 18 may include a build surface 20 that may be exposed within the AMS. During an additive manufacturing process discussed herein, build surface 20 of build plate 18 may receive, and/or be built upon by the AMS to form component 10 including body portion 12 and sacrificial cap 100. Build plate 18 may be formed as a solid component, from any suitable material used in additive manufacturing. In the non-limiting example shown in FIGS. 1 and 2, build plate 18 may be shaped and/or include a geometry of a quadrilateral, and specifically a rectangle. It is understood that shape and/or geometry of build plate 18 shown herein is merely illustrative. As such, build plate 18 may include any geometry and/or size that may correspond to and/or may support the building of component 10 by the AMS, as discussed herein.

Additionally, component 10, and more specifically body portion 12 and sacrificial cap 100, may be formed from any suitable material that may undergo the additive manufacturing process(es) performed by the AMS. In non-limiting examples, body portion 12 and sacrificial cap 100 of component 10 may be formed from thermoplastics, metals, metal-alloys, ceramics, glass and other suitable materials. Additionally, and as discussed herein, each portion (e.g., body portion 12, sacrificial cap 100) of component 10 may be formed by the AMS to include predetermined build characteristics. The predetermined build characteristics may include, but are not limited to, material density or material porosity. The AMS may build body portion 12 and sacrificial cap 100 of component 10 to include substantial similar or distinct predetermined build characteristics by using, selecting, and/or adjusting operational parameters including, but not limited to, the material composition used to form component 10, a strength or power output for an energy emitting device used to form component 10, a speed for the energy emitting device used to form component 10, and so on.

As shown in FIGS. 1 and 2, component 10 may include at least one feature formed in body portion 12. More specifically, component 10 may include at least on feature formed at least partially in, on, and/or through body portion 12. As discussed herein, body portion 12 of component 10 may represent the "final" configuration, geometry, part, and/or assembly manufactured by the AMS that may be used by a component, apparatus, and/or system for an intended purpose. Additionally, the features formed in body portion 12 of component 10 may be specific to the operation and/or function of body portion 12 of component 10.

In a non-limiting example shown in FIGS. 1 and 2, the feature(s) formed in body portion 12 of component 10 may be a plurality of channels 22A, 22B, 22C. The plurality of channels 22A, 22B, 22C may be formed in and/or through body portion 12 of component 10 and may each include a plurality of apertures formed through at least one surface of component 10. For example, and as shown in FIGS. 1 and 2, each channel of the plurality of channels 22A, 22B, 22C may include and/or may be formed by a first aperture 24A, 24B, 24C formed through a "top" surface 26 of body portion 12 of component 10, and a second aperture 28A, 28B, 28C formed through a front surface 30 of body portion 12 of component 10, positioned adjacent and/or below "top" surface 26. As discussed herein, "top" surface 26 of body portion 12 may be a surface of body portion 12 that may be exposed when sacrificial cap 100 is removed. Prior to the removal of sacrificial cap 100, as discussed herein, "top" surface 26 may be considered a reference, artificial, and/or anticipated surface of body portion 12 of component 10 that may be formed below and/or covered by sacrificial cap 100. In other non-limiting examples (see, FIG. 4), first aperture 24A, 24B, 24C and second aperture 28A, 28B, 28C of the plurality of channels 22A, 22B, 22C may be formed through similar surfaces (e.g., "top" surface 28 of body portion 12). Each channel of the plurality of channels 22A, 22B, 22C may fluidly couple each aperture (e.g., first aperture 24A, 24B, 24C to second aperture 28A, 28B, 28C) formed in body portion 12 of component 10.

It is understood that the shape and/or geometry of the plurality of channels 22A, 22B, 22C shown herein is merely illustrative. As such, the plurality of channels 22A, 22B, 22C may include any geometry and/or size that may correspond to an intended function and/or operation for component 10. Additionally, the number of channels of the plurality of channels 22A, 22B, 22C formed in body portion 12 of component 10 shown herein may also be merely illustrative, and component 10 may include more or less channels 22A, 22B, 22C than those shown and discussed herein.

Component 10 may also include sacrificial cap 100. Sacrificial cap 100 may be formed integral with body portion 12 of component 10. That is, and although shown as exploded or separate from body portion 12 in FIG. 1, sacrificial cap 100 may be formed integral with, as a part of, and/or unified with body portion 12 of component 10 (see, FIG. 2). The dashed line shown in FIG. 2 may represent a location within component 10 that separates or distinguishes body portion 12 and sacrificial cap 100. In the non-limiting example shown in FIGS. 1 and 2, sacrificial cap 100 may be formed integral with at least a portion of "top" surface 26 of body portion 12 of component 10. Additionally, and as discussed herein, the removal of sacrificial cap 100 from body portion 12 of component 10 may substantially define and/or expose "top" surface 26, and first apertures 24A, 24B, 24C of the plurality of channels 22A, 22B, 22C (e.g., features) formed in body portion 12 of component 10. Although shown as being formed on and/or integral with "top" surface 26 of body portion 12, it is understood that sacrificial cap 100 may be formed on other portions or surfaces of body portion 12 including front surface 30 (see, FIG. 5), and/or between build surface 20 of build plate 18 and a bottom surface of body portion 12 (not shown).

In the non-limiting example shown in FIGS. 1 and 2, sacrificial cap 100 may include a geometry similar to body portion 12. That is, sacrificial cap 100 may include a geometry, shape, and/or dimensions (e.g., width, depth) similar or substantially identical to body portion 12. As a result, sacrificial cap 100 may cover body portion 12 of component 10. More specifically, sacrificial cap 100 may cover body portion 12, "top" surface 26 of body portion 12, and the plurality of channels 22A, 22B, 22C (e.g., features) formed in body portion 12. Additionally in the non-limiting example shown in FIGS. 1 and 2, where first aperture 24A, 24B, 24C of the plurality of channels 22A, 22B, 22C are formed in or through "top" surface 26, sacrificial cap 100 may also cover first aperture 24A, 24B, 24C. In another non-limiting example (not shown), sacrificial cap 100 may include a geometry, shape, and/or dimensions (e.g., width, depth) substantially distinct from body portion 12 of component 10. In this non-limiting example, sacrificial cap 100 may be sized and/or may include a geometry that may only cover a section of body portion 12 that includes the features (e.g., channels 22A, 22B, 22C) formed therein. As such, a distinct section of body portion 12, and more specifically a section of top surface 26 of body portion 12, may be uncovered by sacrificial cap 100 and may be completely exposed during post-build processing, as discussed herein.

In a non-limiting example, sacrificial cap 100 may also include a predetermined height (H). The predetermined height (H) may be dependent, at least in part, on a post-build process performed on component 10 including sacrificial cap 100. More specifically, the predetermined height (H) of sacrificial cap 100 may be dependent, at least in part, on post-build process performed on component 10 including sacrificial cap 100 that may impart and/or result in a surface of component 10 experiencing a tensile stress. The predetermined height (H) of sacrificial cap 100 may substantially minimize and/or eliminate the tensile stress experienced by or imparted to body portion 12 covered by sacrificial cap 100, the plurality of channels 22A, 22B, 22C (e.g., features), first apertures 24A, 24B, 24C, and/or the portions of "top" surface 26 of body portion 12 surrounding the plurality of channels 22A, 22B, 22C and/or first apertures 24A, 24B, 24C.

In a non-limiting example, the predetermined height (H) may be dependent on a shot peening process that may be performed on component 10 including sacrificial cap 100. In the non-limiting example, the height (H) of sacrificial cap 100 of component 10 may be substantially equal to or larger than the predetermined penetration depth for shot (see, FIG. 10) impacting top surface 102 of sacrificial cap 100 during the shot peening process.

In another non-limiting example, the predetermined height (H) may be dependent on a DMLM process and/or parameters used to form component 10 including sacrificial cap 100. In the non-limiting example, the height (H) of sacrificial cap 100 of component 10 may be substantially equal to or larger than a predetermined depth within component 10 that may experience tensile stress during and after the DMLM process is performed to form component 10. That is, during the DMLM process component 10 including sacrificial cap 100 may substantially contract or experience compressive forces. As a result, the exterior surface of component 10 and a portion of component 10 formed below the exterior surface may experience a tensile stress. In the non-limiting example, the predetermined height (H) of sacrificial cap 100 may be substantially equal to or larger than the predetermined depth of the tensile stress imparted on component 10 during the DMLM process. This predetermined height (H) may ensure body portion 12, the plurality of channels 22A, 22B, 22C (e.g., features), first apertures 24A, 24B, 24C, and/or the portions of "top" surface 26 of body portion 12 surrounding the plurality of channels 22A, 22B, 22C and/or first apertures 24A, 24B, 24C do not experience undesirable tensile stress during the build process discussed herein.

As shown in FIGS. 1 and 2, sacrificial cap 100 may also include at least one conduit 104A, 104B, 104C. More specifically, a plurality of conduits 104A, 104B, 104C may be formed in and/or through sacrificial cap 100. Each of the plurality of conduits 104A, 104B, 104C of sacrificial cap 100 may be in fluid communication with a corresponding channel of the plurality of channels 22A, 22B, 22C (e.g., features) formed in body portion 12 of component 10. That is, conduit 104A of sacrificial cap 100 may be in fluid communication with channel 22A of body portion 12, conduit 104B may be in fluid communication with channel 22B, and conduit 104C may be in fluid communication with channel 22C, respectively. In the non-limiting example shown in FIGS. 1 and 2, the number of conduits 104A, 104B, 104C formed in sacrificial cap 100 may equal the number of channels 22A, 22B, 22C formed in body portion 12. As discussed herein, the formation of the plurality of conduits 104A, 104B, 104C may allow a fluid (e.g., pressurized air) to flow through each of the plurality of conduits 104A, 104B, 104C to the corresponding channel 22A, 22B, 22C formed in body portion 12 in order to remove any unsintered, powder material and/or particles that may undesirably remain in the plurality of channels 22A, 22B, 22C of body portion 12 after the formation of component 10 on build surface 20 of build plate 18.

Each of the plurality of conduits 104A, 104B, 104C of sacrificial cap 100 may also include a plurality of openings. Specifically, and as shown in the non-limiting example of FIGS. 1 and 2, each of the plurality of conduits 104A, 104B, 104C may include a first opening 106A, 106B, 106C and a second opening 108A, 108B, 108C. Each first opening 106A, 106B, 106C of the plurality of conduits 104A, 104B, 104C may be formed in, on, and/or through a "bottom" surface 110 of sacrificial cap 100 of component 10, and each second opening 108A, 108B, 108C may be formed in, on, and/or through top surface 102 of sacrificial cap 100. Each first opening 106A, 106B, 106C of the plurality of conduits 104A, 104B, 104C formed in sacrificial cap 100 may be may be aligned with and/or in direct fluid communication with a corresponding first aperture 24A, 24B, 24C of the plurality of channels 22A, 22B, 22C formed in body portion 12. Additionally as shown in FIGS. 1 and 2, each second opening 108A, 108B, 108C of the plurality of conduits 104A, 104B, 104C formed in sacrificial cap 100 may be formed opposite a corresponding first opening 106A, 106B, 106C, and may be in fluid communication with a corresponding first opening 106A, 106B, 106C via conduit 104A, 104B, 104C. That is, each of the plurality of conduits 104A, 104B, 104C formed in sacrificial cap 100 may be disposed between and may fluidly couple a corresponding first opening 106A, 106B, 106C and second opening 108A, 108B, 108C.

As discussed herein, and similar to "top" surface 26 of body portion 12, "bottom" surface 110 of sacrificial cap 100 may be a surface of sacrificial cap 100 that may be exposed when sacrificial cap 100 is removed from body portion 12. Prior to the removal of sacrificial cap 100, as discussed herein, "bottom" surface 110 may be considered a reference, artificial, and/or anticipated surface of sacrificial cap 100 of component 10 that may be formed above and/or may cover "top" surface 26 of body portion 12. Additionally, and as discussed herein, the removal of sacrificial cap 100 from body portion 12 of component 10 may substantially define and/or expose "bottom" surface 110.

Sacrificial cap 100 may allow a fluid (e.g., pressurized air) to flow through the plurality of channels 22A, 22B, 22C formed through body portion 12 of component 10 to remove any unsintered, powder material and/or particles that may undesirably remain in channels the plurality of channels 22A, 22B, 22C after the formation of component 10. In a non-limiting example, the fluid utilized to remove unsintered, powder material and/or particles from the plurality of channels 22A, 22B, 22C may flow through sacrificial cap 100 and body portion 12 of component 10, respectively, in the following sequential order: second openings 108A, 108B, 108C, conduits 104A, 104B, 104C, first openings 106A, 106B, 106C, first aperture 24A, 24B, 24C, the plurality of channels 22A, 22B, 22C, and second apertures 28A, 28B, 28C. In another non-limiting example, the fluid may flow through sacrificial cap 100 and body portion 12 of component 10, respectively, in the following order: second apertures 28A, 28B, 28C, the plurality of channels 22A, 22B, 22C, first aperture 24A, 24B, 24C, first openings 106A, 106B, 106C, the plurality of conduits 104A, 104B, 104C, and second openings 108A, 108B, 108C. It is understood that all channels of the plurality of channels 22A, 22B, 22C of body portion 12 may be exposed to the fluid at one time. Alternatively, only a portion, or one channel, of the plurality of channels 22A, 22B, 22C may be exposed to the fluid to remove any unsintered, powder material and/or particles that may undesirably remain in channels 22A, 22B, 22C after the formation of component 10 including sacrificial cap 100, as discussed herein.

As discussed herein, sacrificial cap 100 of component 10 may be formed by undergoing the same additive manufacturing process(es), such as a direct metal laser metaling (DMLM), performed by the AMS that may form body portion 12 of component 10. Additionally, and as discussed herein, sacrificial cap 100 may be formed from the same material as body portion 12 of component 10, which may include, but is not limited to, thermoplastics, metals, metal-alloys, ceramics, glass and other suitable material. Sacrificial cap 100 of component 10 may be formed by the AMS to include substantially similar or distinct predetermined build characteristics from the predetermined build characteristics of body portion 12 of component 10. In a non-limiting example wherein the predetermined build characteristics differ between sacrificial cap 100 and body portion 12, the material density or material porosity of sacrificial cap 100 may differ from the material density or material porosity of body portion 12. More specifically, the material density or material porosity of sacrificial cap 100 may be less than the material density or material porosity of body portion 12. The reduced material density or material porosity of sacrificial cap 100 may make it easier to remove sacrificial cap 100 in subsequent processing steps, and/or allow sacrificial cap 100 to be more flexible and/or ductile than body portion 12. The increased flexibility and/or ductility of sacrificial cap 100 may allow more tensile stress imparted or experienced by sacrificial cap 100 of component 10 during post-build process (e.g., shot peening, recrystallization) to be absorbed, dissipated, and/or prevented from being imparted or experienced by body portion 12, as discussed herein. The AMS may build sacrificial cap 100 to include distinct predetermined build characteristics from those of body portion 12 by, for example, adjusting a strength or power output for an energy emitting device used to form sacrificial cap 100 and body portion 12, and/or a speed for the energy emitting device used to form sacrificial cap 100 and body portion 12.

Figure 3:
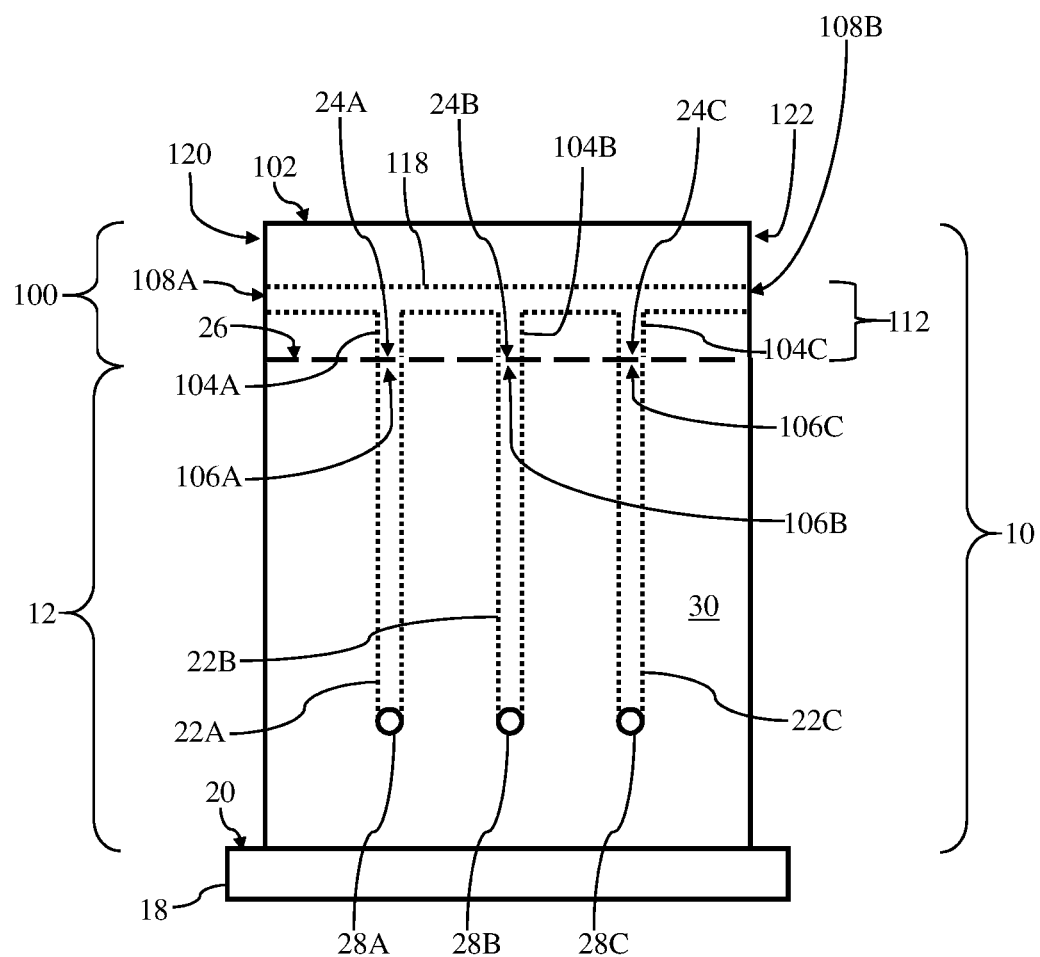
FIG. 3 shows a front view of a component including a sacrificial cap and a build plate, according to other embodiments of the disclosure.

FIG. 3 shows a front view of another non-limiting example of component 10 including body portion 12 and sacrificial cap 100 formed on build plate 18. It is understood that similarly numbered and/or named components may function in a substantially similar fashion. Redundant explanation of these components has been omitted for clarity.

In the non-limiting example shown in FIG. 3, sacrificial cap 100 may include a manifold 112 formed therein. Manifold 112 of sacrificial cap 100 may be in fluid communication with each of the plurality of channels 22A, 22B, 22C (e.g., features) formed in and/or through body portion 12 of component 10. Manifold 112 may include the plurality of conduits 104A, 104B, 104C, and a single manifold conduit 118 in fluid communication with each of the plurality of conduits 104A, 104B, 104C. That is, the plurality of conduits 104A, 104B, 104C formed in sacrificial cap 100 may form a portion of manifold 112 in fluid communication with the plurality of channels 22A, 22B, 22C, respectively, formed in body portion 12. Similar to the plurality of conduits 104A, 104B, 104C shown and discussed herein with respect to FIGS. 1 and 2, each of the plurality of conduits 104A, 104B, 104C of manifold 112 formed in sacrificial cap 100 may be in fluid communication with a corresponding channel of the plurality of channels 22A, 22B, 22C (e.g., features) formed in body portion 12 of component 10. However, distinct from the non-limiting example shown and discussed herein with respect to FIGS. 1 and 2, the plurality of conduits 104A, 104B, 104C may not extend completely through sacrificial cap 100 to top surface 102. Rather, the plurality of conduits 104A, 104B, 104C shown in FIG. 3 may extend to and be fluidly coupled and/or in fluid communication with manifold conduit 118. Additionally in the non-limiting example shown in FIG. 3, manifold conduit 118 of manifold 112 may extend between opposing sides 120, 122 of sacrificial cap 100 of component 10, and may be positioned above the plurality of conduits 104A, 104B, 104C.

Manifold 112 of sacrificial cap 100 may also include a plurality of openings. As shown in the non-limiting example of FIG. 3, manifold 112, and more specifically each of the plurality of conduits 104A, 104B, 104C forming a portion of manifold 112, may include first opening 106A, 106B, 106C. As similarly discussed herein with respect to FIGS. 1 and 2, each first opening 106A, 106B, 106C of the plurality of conduits 104A, 104B, 104C of manifold 112 may be formed in, on, and/or through "bottom" surface 110 of sacrificial cap 100 of component 10. Additionally, first opening 106A, 106B, 106C of manifold 112 be may be aligned with and/or may be in direct fluid communication with a corresponding first aperture 24A, 24B, 24C of the plurality of channels 22A, 22B, 22C formed in body portion 12.

Manifold 112 may also include at least one second opening 108A, 108B. More specifically, manifold conduit 118 of manifold 112 formed in sacrificial cap 100 may include second openings 108A, 108B. As shown in the non-limiting example of FIG. 3, each of second openings 108A, 108B of manifold 112 may be formed in, on and/or through distinct, opposing sides 120, 122 of sacrificial cap 100. Second openings 108A, 108B may be in fluid communication with first opening 106A, 106B, 106C, respectively, via manifold 112. That is, second openings 108A, 108B may be in fluid communication with each one of first openings 106A, 106B, 106C via manifold conduit 118 and each of the plurality of conduits 104A, 104B, 104C, respectively. Although two second openings 108A, 108B are shown in FIG. 3, it is understood that the number of second openings 108A, 108B included in manifold 112 of sacrificial cap 100 shown herein may be merely illustrative, and manifold 112 may include more or less second openings 108A, 108B than those shown and discussed herein.

Similarly to the plurality of conduits 104A, 104B, 104C shown in FIGS. 1 and 2, the formation of manifold 112 within sacrificial cap 100 may allow a fluid (e.g., pressurized air) to flow through manifold 112 to the corresponding channel 22A, 22B, 22C formed in body portion 12. The fluid flowing through manifold 112 of sacrificial cap 100 to the plurality of channels 22A, 22B, 22C of body portion 12 may substantially remove any unsintered, powder material and/or particles that may undesirably remain in the plurality of channels 22A, 22B, 22C of body portion 12 after the formation of component 10.

As discussed herein, sacrificial cap 100 may be removed from body portion 12 before or after at least one post-build process is performed on component 10. That is, sacrificial cap 100 may be removed from body portion 12 before the post-build process(es) is performed on component 10, after the post-build process(es) is performed on component 10, or after at least one post-build process is performed on component 10, but before all post-build processes are performed on component 10. Additionally as discussed herein, the specific post-build process(es) performed on component 10 may determine when in the build process sacrificial cap 100 is removed from component 10. The point during the post-build process of component 10 in which sacrificial cap 100 is removed may also be dependent, at least in part, on the configuration of sacrificial cap 100 and its features. In non-limiting examples, whether sacrificial cap 100 includes only the plurality of conduits 104A, 104B, 104C (see, FIGS. 1 and 2), or if sacrificial cap 100 includes a manifold 112 (see, FIG. 3), may influence when sacrificial cap 100 is removed from component 10 during the post-build process. In another non-limiting example where sacrificial cap 100 includes the plurality of conduits 104A, 104B, 104C, the position or surface in which second openings 108A, 108B, 108C are formed may also influence when sacrificial cap 100 is removed from component 10 during the post-build process.

Briefly returning to the non-limiting example shown in FIGS. 1 and 2, the plurality of conduits 104A, 104B, 104C formed in sacrificial cap 100 are formed substantially straight through sacrificial cap 100 between top surface 102 and "bottom" surface 110. In this non-limiting example, and as discussed herein, sacrificial cap 100 of component 10 may include a predetermined height (H) that may be substantially equal to or larger than the predetermined depth of the tensile stress imparted on component 10 during the DMLM process. As such, sacrificial cap 100 may substantially contain the tensile stress experienced by component 10 during and/or after the performance of the DMLM process to form component 10. Following the DMLM process, sacrificial cap 100 may be removed from body portion 12 before performing the recrystallization process on body portion 12 of component 10. By removing sacrificial cap 100 from body portion 12 prior to performing the recrystallization process, the tensile stress experienced by body portion 12 and/or "top" surface 26 of component 10 may be substantially removed and/or limited during the recrystallization process. Additionally in this non-limiting example, sacrificial cap 100 may be removed prior to performing the shot peening process so "top" surface 26 may receive the benefit of performing the shot peening process. The plurality of channels 22A, 22B, 22C may be masked and/or covered with an additional material, component, and/or plug to prevent shot peen from entering the channels 22A, 22B, 22C.

Additionally, the non-limiting example shown in FIG. 3 including manifold 112 formed in sacrificial cap 100 may leave top surface 102 of sacrificial cap 100 substantially solid or continuous (e.g., no openings formed through top surface 102). As a result of the substantially solid or continuous top surface 102 of sacrificial cap 100, sacrificial cap 100 including manifold 112 may not be removed form component 10 until after a shot peening process is performed on component 10. Removing sacrificial cap 100 including manifold 112 after performing the shot peening process may substantially prevent the shot from impacting "top" surface 26 of body portion 12 and/or first apertures 24A, 24B, 24C of the plurality of channels 22A, 22B, 22C directly.

Figure 4:
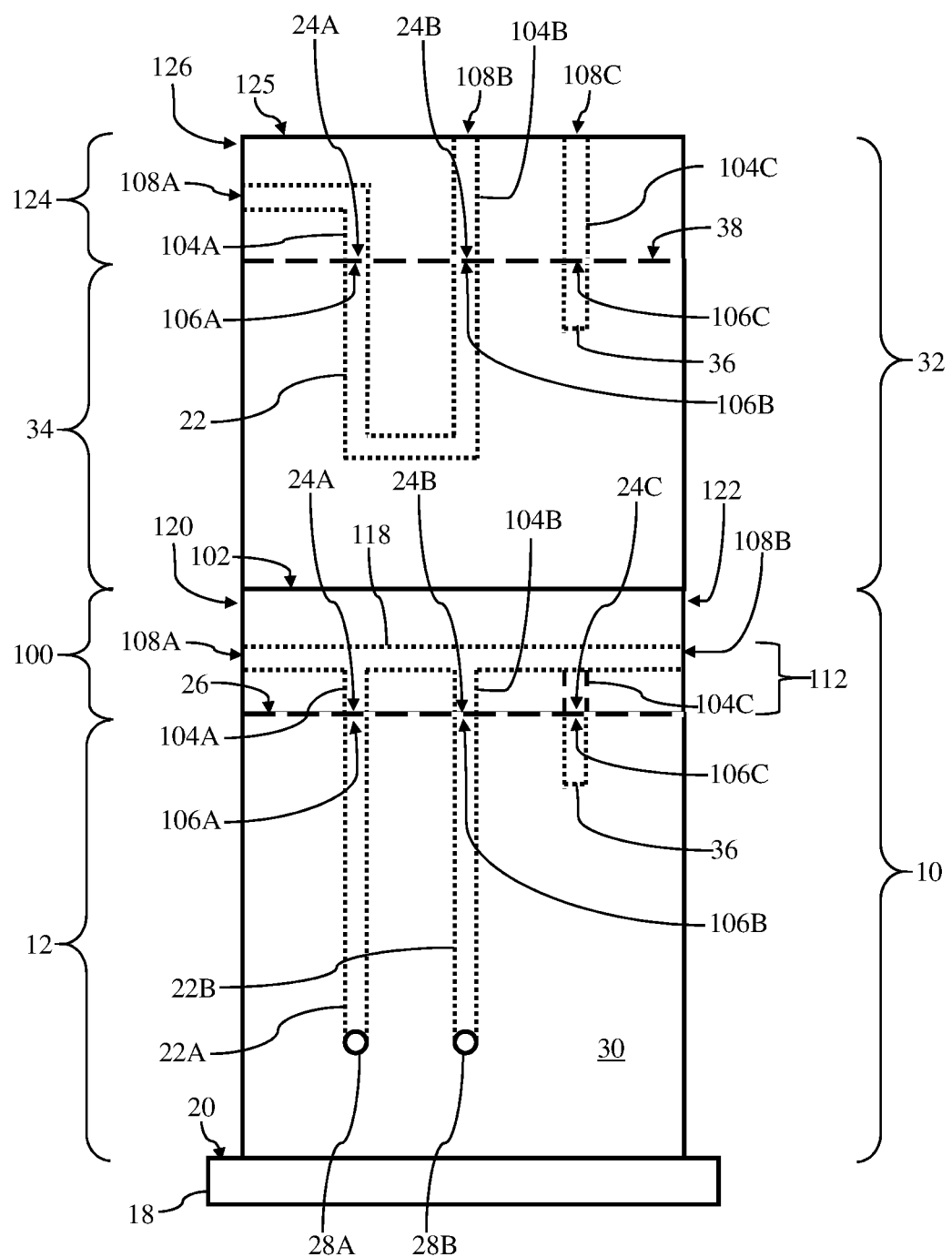
FIG. 4 shows a front view of a first component including a first sacrificial cap and a second component including a second sacrificial cap, according to embodiments of the disclosure.

FIG. 4 shows a front view of a non-limiting example of a first component 10 including body portion 12 and sacrificial cap 100 formed on build plate 18, and a distinct, second component 32 including body portion 34 and sacrificial cap 124 formed on sacrificial cap 100 of first component 10. Sacrificial cap 100 of first component 10 may be substantially similar to sacrificial cap 100 shown and discussed herein with respect to FIG. 3. Specifically, sacrificial cap 100 of first component 10 may include manifold 112 and a substantially solid or continuous top surface 102. As a result, the AMS may build second component 32 including body portion 34 and sacrificial cap 124 directly top surface 102 of sacrificial cap 100 of first component 10 using similar additive manufacturing process(es) (e.g., DMLM) discussed herein.

Also shown in the non-limiting example of FIG. 4, each of first component 10, and second component 32 may include a recess 36. That is, first component 10 may include recess 36 formed partially through body portion 12, and second component 32 may include recess 36 formed partially through body portion 34. Additionally as shown in FIG. 4, recess 36 may be formed in, on, and/or through "top" surface 26 of body portion 12, and recess 32 may be formed in, on, and/or through "top" surface 38 of body portion 34.

Sacrificial caps 100, 124 of first component 10 and second component 32, respectively, may engage or interact with recesses 36 in a variety of ways. In a non-limiting example, sacrificial cap 100 of first component 10 may be built on body portion 12 to substantially cover recess 36 formed therein. That is, sacrificial cap 100 of first component 10 may substantially cover, and/or may not include a conduit fluidly coupling recess 36 to manifold conduit 118 of manifold 112 formed in sacrificial cap 100. In another non-limiting example, manifold 112 formed in sacrificial cap 100 may be in fluid communication with recess 36. Specifically, manifold 112 of sacrificial cap 100 may include a manifold 112 including a conduit 104C in direct fluid communication with recess 36 and manifold conduit 118 in direct fluid communication with conduit 104C. In an additional non-limiting example, and with reference to second component 32, sacrificial cap 124 may include the plurality of conduits 104A, 104B, 104C, where one conduit 104C of the plurality of conduits 104A, 104B, 104C may be in fluid communication with recess 36.

Conduit 104C of manifold 112 formed in sacrificial cap 100 may be in fluid communication with recess 36 formed partially through body portion 12 in a substantially similar manner or fashion as the plurality of conduits 104A, 104B, 104C of manifold 112 in fluid communication with a corresponding channel of the plurality of channels 22A, 22B, 22C discussed herein (see, FIG. 3). Additionally, conduit 104C of sacrificial cap 124 may be in fluid communication with recess 36 formed partially through body portion 34 in a substantially similar manner or fashion as the plurality of conduits 104A, 104B, 104C in fluid communication with a corresponding channel of the plurality of channels 22A, 22B, 22C discussed herein (see, FIGS. 1 and 2). Redundant explanation of these components has been omitted for clarity.

Additionally as shown in FIG. 4, the non-limiting example of second component 32 may include distinct features. That is, body portion 34 of second component 32 may include channel 22 formed through body portion 34. Channel 22 may include first aperture 24 and second aperture 28 formed through the same surface of body portion 34. Specifically, channel 22 of second component 32 may include first aperture 24 and second aperture 28 formed through "top" surface 38 of body portion 34. As a result, sacrificial cap 124 of second component 32 may cover first aperture 24 and second aperture 28 formed through "top" surface 38 of body portion 34. Additionally, and as a result of first aperture 24 and second aperture being formed through "top" surface 38, both conduit 104A, and conduit 104B of the plurality of conduits 104A, 104B, 104C formed in sacrificial cap 124 may be in fluid communication with channel 22. Specifically, conduit 104A of sacrificial cap 124 of second component 32 may be in direct fluid communication with first aperture 24 of channel 22, and conduit 104B of sacrificial cap 124 may be in direct fluid communication with second aperture 28 of channel 22.

Additionally, and distinct from sacrificial cap 100 shown and discussed herein with respect to FIGS. 1 and 2, second opening 108A of conduit 104A of sacrificial cap 124 shown in FIG. 4 may not be formed through top surface 125 of sacrificial cap 124. Rather, second opening 108A of conduit 104A of sacrificial cap 124 may be formed in, on and/or through side surface 126 of sacrificial cap 124 of second component 32. Similar to the benefits discussed herein with respect to sacrificial cap 100 of FIG. 3, forming second opening 108A of conduit 104A of sacrificial cap 124 in, on, and/or through side surface 126 may result in the portion of top surface 125 of sacrificial cap 124 positioned above first aperture 24 of conduit 22 to be substantially solid or continuous. As such, first aperture 24 of conduit 22 formed in body portion 34 of second component 32 may not be directly impacted by shot during a shot peening process performed on second component 32.

Figure 5:
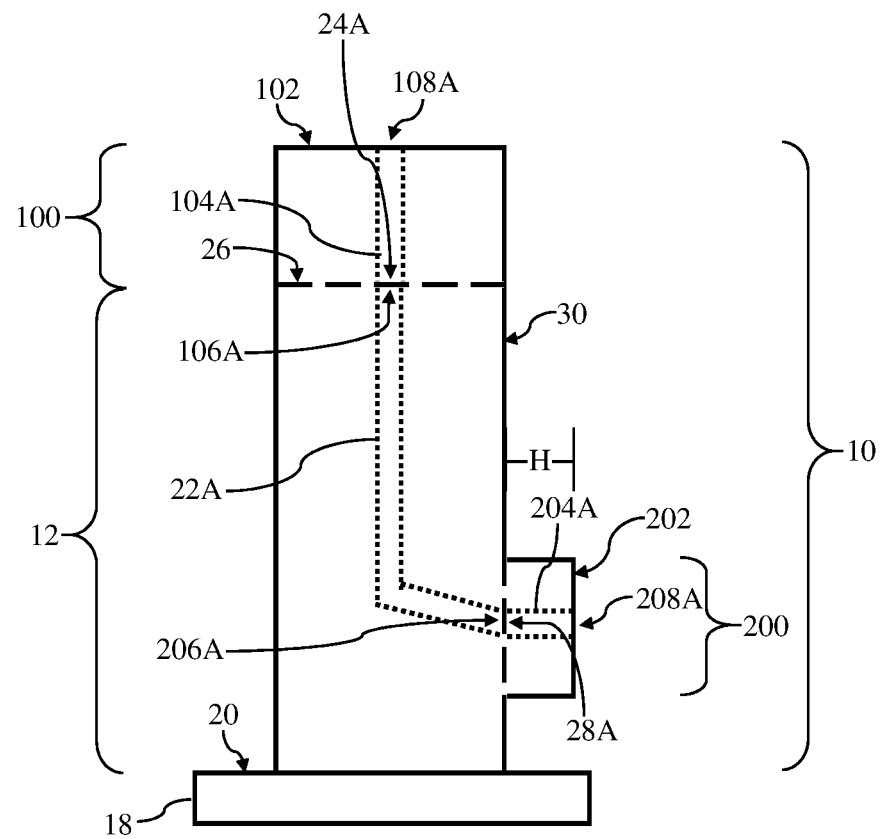
FIG. 5 shows a side view of a first component including a first sacrificial cap and a second sacrificial cap, according to embodiments of the disclosure.

FIG. 5 shows a side view of another non-limiting example of component 10 build on build plate 18 of the AMS. Component 10 shown in FIG. 5 may include body portion 12 and sacrificial cap 100 substantially similar to those shown and discussed herein with respect to FIGS. 1 and 2. Redundant explanation of these components has been omitted for clarity.

As shown in FIG. 5, component 10 may also include a distinct sacrificial cap 200 built integral with body portion 12. Specifically, component 10 may include sacrificial cap 200 formed integral with, as a part of, and/or unified with body portion 12 of component 10. The dashed line shown in FIG. 5 may represent a location within component 10 that separates or distinguishes body portion 12 and sacrificial cap 200. In the non-limiting example shown in FIG. 5, sacrificial cap 200 may be formed integral with at least a portion of front surface 30 of body portion 12 of component 10. Additionally, sacrificial cap 200 may also cover a portion of front surface 30 of body portion 12, and second apertures 28A, 28B, 28C of the plurality of channels 22A, 22B, 22C (e.g., features) formed in body portion 12. As similarly discussed herein with respect to sacrificial cap 100 (see, FIGS. 1 and 2) sacrificial cap 200 may include a predetermined height (H) that may substantially minimize and/or eliminate the tensile stress experienced by or imparted to the plurality of channels 22A, 22B, 22C (e.g., features), second apertures 28A, 28B, 28C, and/or the portions of front surface 30 of body portion 12 surrounding the plurality of channels 22A, 22B, 22C and/or second apertures 28A, 28B, 28C.

Similar to sacrificial cap 100 discussed herein with respect to FIGS. 1 and 2, sacrificial cap 200 may also include at least one conduit 204A, 204B (not shown), 204C (not shown). More specifically, a plurality of conduits 204A, 204B, 204C may be formed in and/or through sacrificial cap 100. Each of the plurality of conduits 204A, 204B, 204C of sacrificial cap 200 may be in fluid communication with a corresponding channel of the plurality of channels 22A, 22B, 22C (e.g., features) and/or second aperture 28A, 28B, 28C formed in body portion 12 of component 10. Additionally, each of the plurality of conduits 204A, 204B, 204C of sacrificial cap 200 may also include a plurality of openings. That is, and also similar to conduits 104A, 104B, 104C of sacrificial cap 100, each of the plurality of conduits 204A, 204B, 204C of sacrificial cap 200 may include a first opening 206A, 206B (not shown), 206C (not shown) in direct fluid communication with a corresponding second aperture 28A, 28B, 28C of the plurality of channels 22A, 22B, 22C, and a second opening 208A, 208B (not shown), 208C (not shown) formed through surface 202, opposite first openings 206A, 206B, 206C.

Figure 6:
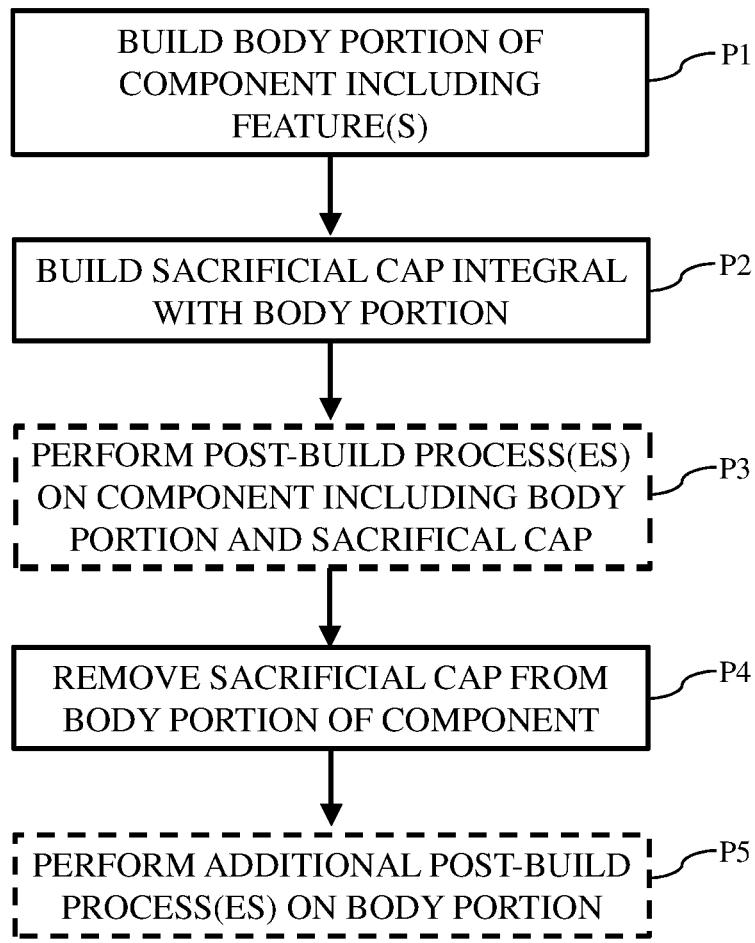
FIG. 6 shows a flow chart of an example process for forming an additive manufactured component including a sacrificial cap, according to embodiments of the disclosure.

FIG. 6 shows non-limiting example processes for forming a component using an additive manufacturing system. Specifically, FIG. 6 is a flowchart depicting example processes for forming a component (temporarily) including a body portion and a sacrificial cap. In some cases, the processes may be used to form component 10, as discussed herein with respect to FIGS. 1-5, and component 32 shown in FIG. 4.

In process P1, a body portion of the component may be built. Specifically, the additive manufacturing system (AMS) may perform a build process (e.g., direct metal laser melting) to build a body portion of the component directly on a build plate of the additive manufacturing system. The body portion of the component may be built to include at least one feature. The feature(s) may be formed in body portion, and may include at least one aperture formed through a surface of the body portion. In non-limiting examples, the feature(s) formed or included in the body portion may include at least one channel including two distinct openings, or a recess formed partially through the body portion of the component. The two distinct openings of the channel(s) formed in the body portion may be formed in, on, and/or through the same surface of the body portion, or alternatively, may be formed in, on, and/or through distinct surfaces of the body portion.

In process P2, a sacrificial cap may be built on the body portion of the component. More specifically, a sacrificial cap may be formed directly on and integral with the surface of the body portion. Building the sacrificial cap may include forming at least one of conduit(s) and/or a manifold within the sacrificial cap. The conduit(s) or the manifold formed in the sacrificial cap may be in fluid communication with the feature formed in the built, body portion of the component. The surface of the body portion in which the sacrificial cap is built may include the aperture of the feature formed in the body portion. As such, building the sacrificial cap on and integral with the body portion may also include covering the feature and/or the aperture of the feature formed in the body portion of the component.

Building the sacrificial cap may also include forming a first opening in direct fluid communication with the aperture of the feature formed in the body portion, and forming a second opening opposite the first opening. The second opening may be in fluid communication with the first opening via the conduit and/or the manifold. Furthermore, building the sacrificial cap may also include building the sacrificial cap to include a material density that is distinct, and more specifically less than, a material density of the body portion of the component. The AMS may build the sacrificial cap to include a distinct material density from the material density of the body portion by, for example, adjusting a strength or power output for an energy emitting device used to form or build the sacrificial cap and the body portion, and/or a speed for the energy emitting device used to form or build the sacrificial cap and the body portion.

In process P3 (shown in phantom as optional), at least one post-build process may be performed on the component including the body portion and the sacrificial cap. Specifically, and subsequent to forming the sacrificial cap on and integral with the body portion, one or more post-build processes may be performed on the body portion and/or the sacrificial cap of the component. The post-build process(es) performed on the component including the body portion and the sacrificial cap may prepare the body portion of the component to be used by a component, apparatus, and/or system for an intended purpose. Performing the at least one post-build process on the component including the body portion and the sacrificial cap may also include, for example, shot peening the body portion and/or the sacrificial cap built directly on and integral with the surface of the body portion of the component, and/or recrystallizing the component including the body portion and the sacrificial cap.

In process P4, the sacrificial cap may be removed from the body portion. That is, and in the non-limiting example where at least one post-build process is performed on the component (e.g., option process P3), the sacrificial cap may be removed from the body portion of the component. Removing the sacrificial cap from the body portion may substantially expose the surface of the body portion, the feature formed in the body portion and/or the aperture of the feature formed in, on, and/or through the surface of the body portion. The sacrificial cap may be removed by performing any now known or later developed cutting process, e.g., electro-discharge machining (EDM), cutting wheel, etc. For example, removing the sacrificial cap may include at least one of, cutting the sacrificial cap from the body portion, grinding the sacrificial cap from the body portion, milling the sacrificial cap from the body portion, and so on.

In process P5 (shown in phantom as optional), additional post-build process(es) may be performed on the body portion. Specifically, and subsequent to removing the sacrificial cap from the body portion, additional post-build process(s) may be performed on the body portion to prepare body portion, and/or provide body portion for its intended use. In a non-limiting example where only a shot peening process is performed in process P3, the body portion may undergo a recrystallization process without the sacrificial cap.

Although discussed herein as two distinct processes, it is understood that processes P1 and P2 may be performed continuously and/or as a single step. That is, as soon as the body portion of the component is built, the sacrificial cap may be built immediately on the body portion without a pause and/or stoppage of the build process and/or the system utilized to build the component including the body portion and the sacrificial cap. In another non-limiting example, the body portion of the component built in process P1 may be built prior to and/or at an earlier time and may be removed from the AM system, set aside and/or stored. The previously built body portion of the component may be later utilized and/or inserted into an AM system, and process P2 may be performed to build the sacrificial cap on the body portion at a later time. Additionally, the order in which processes P1 and P2 are performed may be dependent, at least in part, on the location of the sacrificial cap within the component. For example, where the sacrificial cap is formed on a front surface of the body portion of the component, the body portion and the sacrificial cap of the component may be built (e.g., processes P1 and P2) at the same time.

Figure 7:
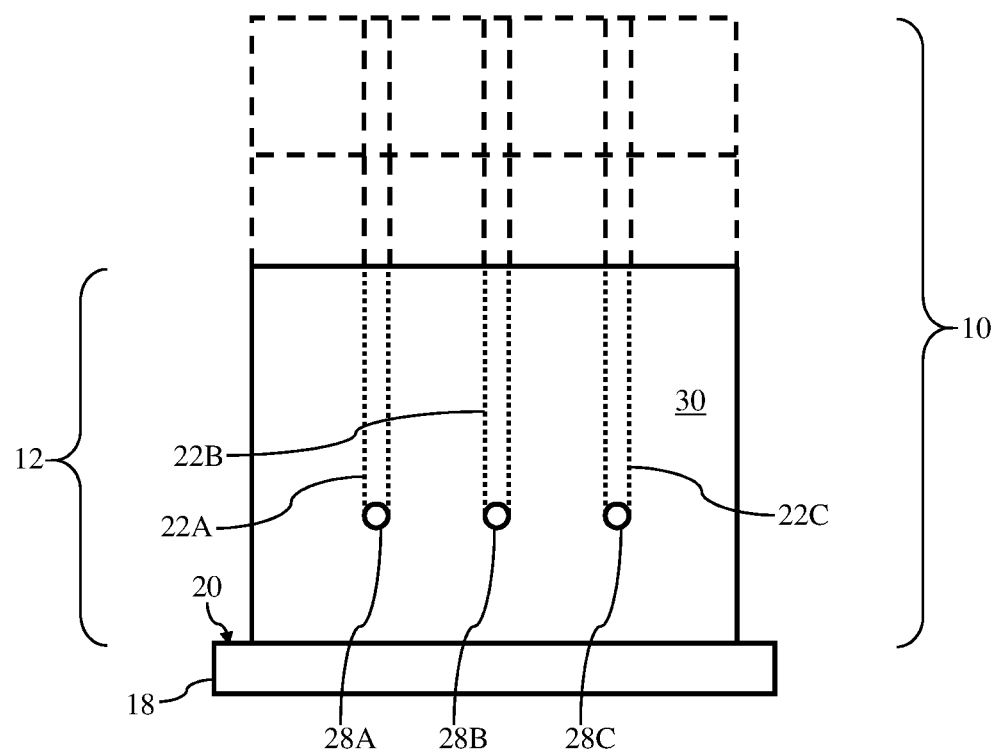
FIGS. 7-11 show a front view of a component and a sacrificial cap undergoing the process of FIG. 6, according to embodiments of the disclosure.
Figure 8:
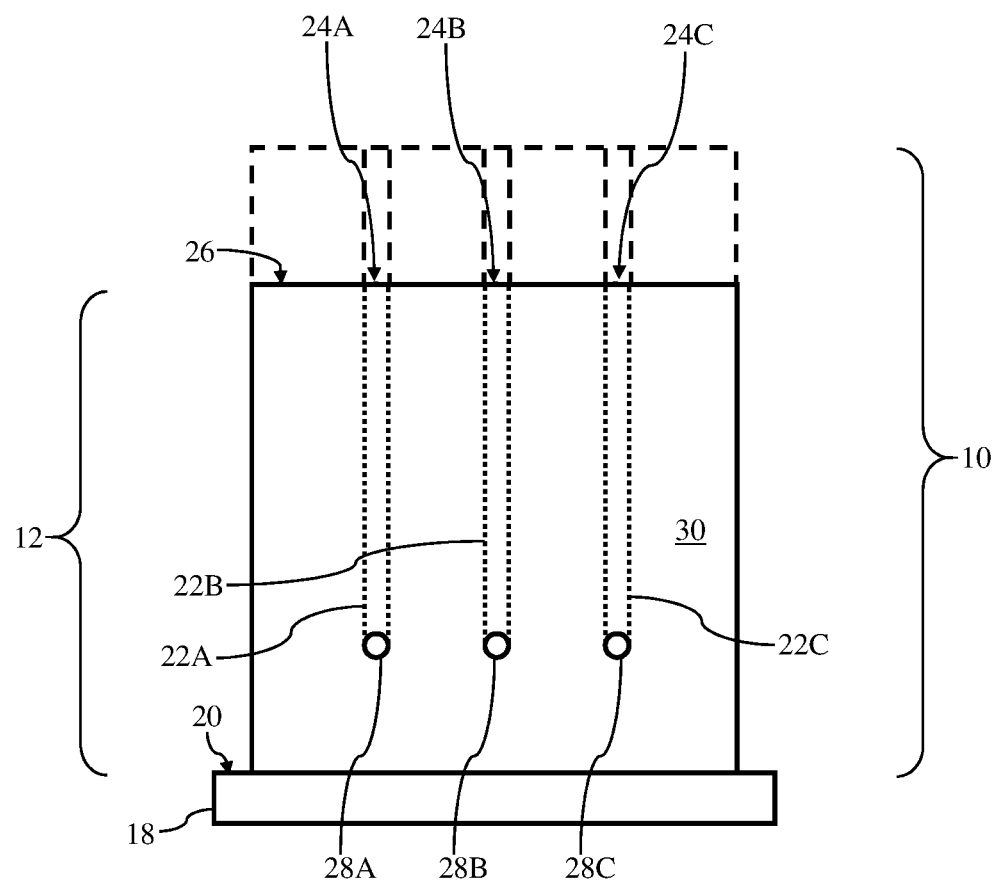
Figure 9:
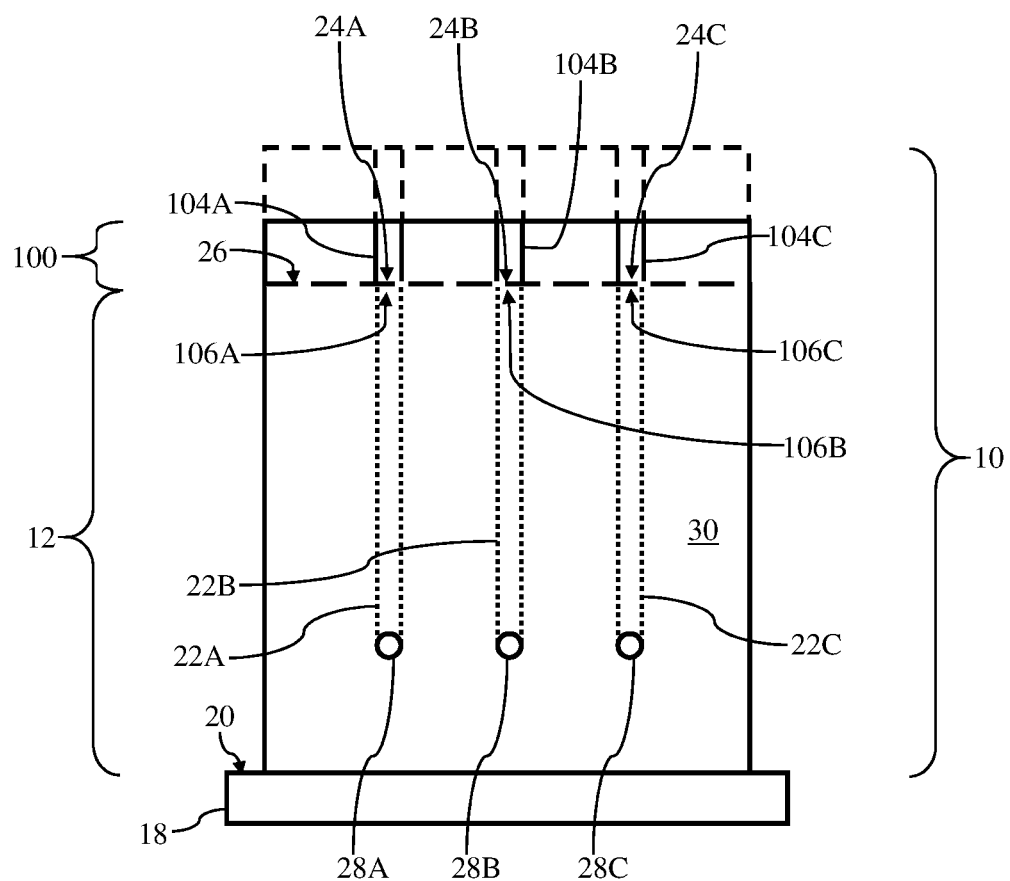
Figure 10:
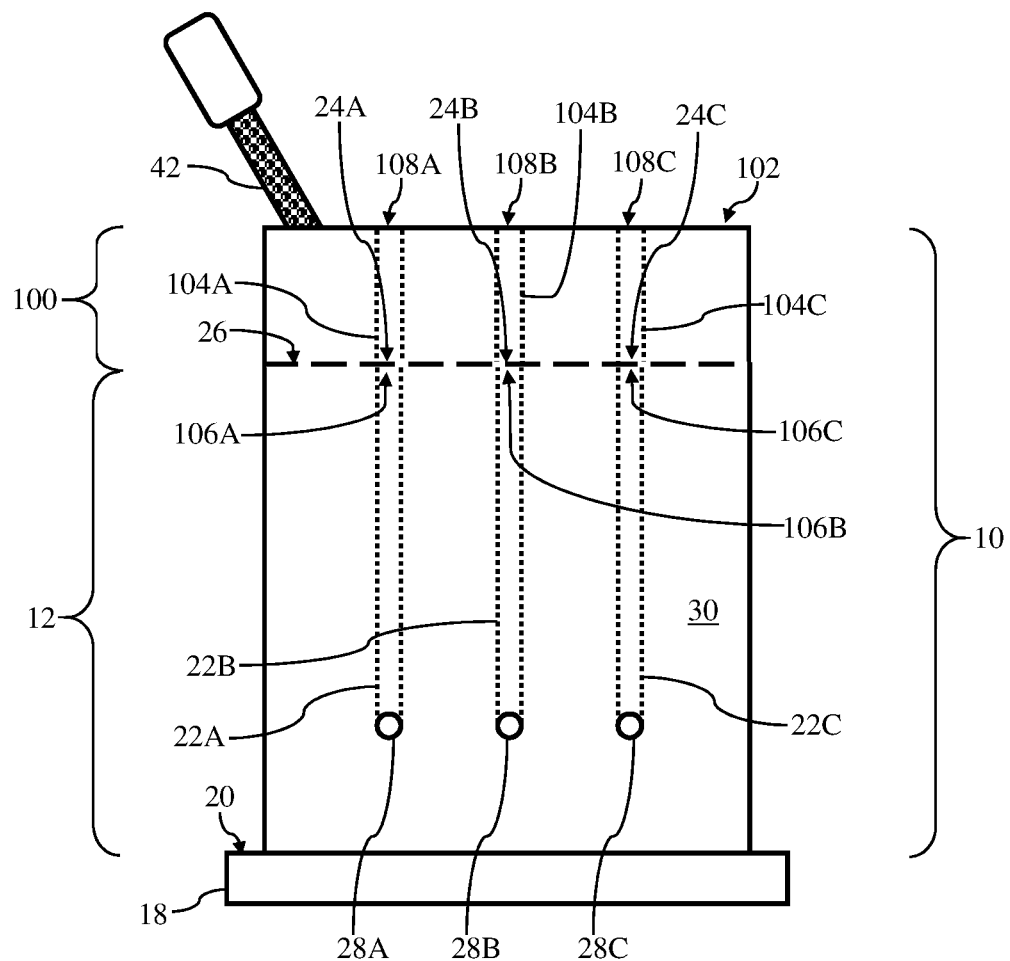
Figure 11:
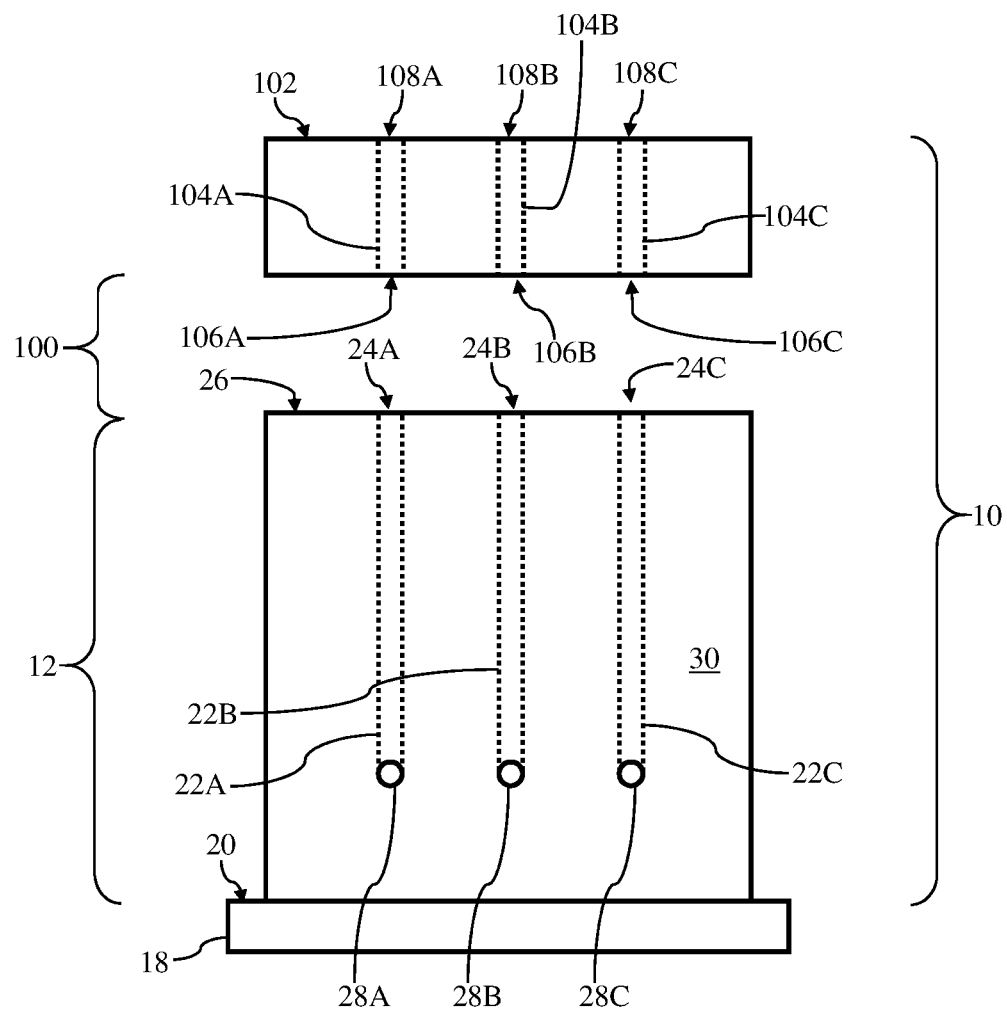

FIGS. 7-11 depict front views of component 10 undergoing a formation process by an additive manufacturing system (AMS) (see, FIG. 12), as discussed herein with respect to FIG. 6. Specifically, FIGS. 7 and 8 depicts front views of body portion 12 of component 10 being built, FIG. 9 depicts a front view of sacrificial cap 100 being built integral with body portion 12 of component 10, FIG. 10 shows component 10 including body portion 12 and sacrificial cap 100 undergoing post-build process(es), and FIG. 11 shows a front view of sacrificial cap 100 removed from body portion 12. It is understood that similarly numbered and/or named components may function in a substantially similar fashion. Redundant explanation of these components has been omitted for clarity.

Turning to FIGS. 7 and 8, body portion 12 of component 10 is shown undergoing a build process. Specifically, in FIG. 7 a portion of body portion 12 of component 10 is shown as being built using the AMS (see, FIG. 12), as discussed herein. Additionally, FIG. 8 shows body portion 12 of component 10 being completely built by the AMS. As shown in FIGS. 7 and 8, and as discussed herein, the AMS preforms an additive manufacturing process, such as direct metal laser metaling (DMLD), in which layers of powder material are layered and then at least one energy emitting device emits an energy to transform the powder material and/or alter the physical state of the powder material from a granular composition to a solid material to build body portion 12 of component 10. In the non-limiting example shown in FIGS. 7 and 8, building body portion 12 of component 10 using the AMS may also include forming features, and more specifically channels 22A, 22B, 22C, first apertures 24A, 24B, 24C, and second apertures 28A, 28B, 28C, within body portion 12 of component 10 and/or on various surfaces, such as "top" surface 26 and front surface 30, of body portion 12. Building body portion 12 of component 10, as shown in FIGS. 7 and 8, may be substantially similar to process P1 discussed herein with respect to FIG. 6.

In FIGS. 9 and 10, sacrificial cap 100 of component 10 is shown undergoing a build process. Specifically, in FIG. 9 a portion of sacrificial cap 100 of component 10 is shown as being built using the AMS (see, FIG. 12), as discussed herein. Additionally, FIG. 10 shows sacrificial cap 100 of component 10 being completely built by the AMS. As shown in FIGS. 9 and 10, and as discussed herein, sacrificial cap 100 may be built directly on and integral with body portion 12 of component 10. In the non-limiting example, sacrificial cap 100 may be built directly on and integral with "top" surface 26 of body portion 12, and as a result, may substantially cover "top" surface 26, and the features (e.g., the plurality of channels 22A, 22B, 22C, first apertures 24A, 24B, 24C) formed in, on, and/or through "top" surface 26 of body portion 12. Similar to body portion 12, the AMS may perform an additive manufacturing process, such as direct metal laser metaling (DMLD), in which layers of powder material are layered and then at least one energy emitting device emits an energy to transform the powder material and/or alter the physical state of the powder material from a granular composition to a solid material to build sacrificial cap 100 on body portion 12. In a non-limiting example, and as discussed herein, the AMS may alter operational characteristics or parameters (e.g., energy emitting device strength, energy emitting device speed) in order to form sacrificial cap 100 with a material density that is less than the material density of body portion 12. Additionally as shown in FIGS. 9 and 10, building sacrificial cap 100 of component 10 using the AMS may also include forming the plurality of conduits 104A, 104B, 104C, first openings 106A, 106B, 106C, and second openings 108A, 108B, 108C, within sacrificial cap 100 of component 10 and/or on various surfaces, such as top surface 102 and "bottom" surface 100, of sacrificial cap 100. Building sacrificial cap 100 on and integral with body portion 12 of component 10, as shown in FIGS. 9 and 10, may be substantially similar to process P2 discussed herein with respect to FIG. 6.

With continued reference to FIG. 10, a post-build process is shown as being performed on component 10. That is, and in the non-limiting example shown in FIG. 10, component 10 including body portion 10 and sacrificial cap 100 may be shown undergoing a shot peening process. During the shot peening process, shot 42 may be projected toward and/or may impact a surface of component 10 to form a compressive stress within the material of component 10. In the non-limiting example, shot 42 may impact top surface 102 of sacrificial cap 100 of component 10 to provide a compressive stress to component 10, and more specifically, sacrificial cap 100 and body portion 12 formed below sacrificial cap 100. As discussed herein, sacrificial cap 100 may include a predetermined height (H) which may substantially minimize and/or eliminate an undesirable amount of stress (e.g., tensile, compressive) experienced by or imparted to the plurality of channels 22A, 22B, 22C (e.g., features), first apertures 24A, 24B, 24C, and/or the portions of "top" surface 26 of body portion 12 surrounding the plurality of channels 22A, 22B, 22C. Performing the at least one post-building process on component 10, as shown in FIG. 10, may be substantially similar to (optional) process P3 discussed herein with respect to FIG. 6.

FIG. 11 shows sacrificial cap 100 of component 10 removed from body portion 12. Specifically, after performing at least one post-build process (e.g., shot peening; FIG. 10), sacrificial cap 100 may be removed from body portion 12. Sacrificial cap 100 may be removed to separate sacrificial cap 100 from body portion 12, which as discussed herein, includes a final configuration of component 10 that may be utilized for an intended purpose. Additionally, removing sacrificial cap 100 may substantially expose "top" surface 26 of body portion 12, the plurality of channels 22A, 22B, 22C formed in body portion 12, and/or first apertures 24A, 24B, 24C formed in, on, and/or through "top" surface 26 of body portion 12. Sacrificial cap 100 may be removed by performing any now known or later developed material removal process including, but not limited to, cutting, grinding, milling, abrading, and the like. Removing sacrificial cap 100 from body portion 12 of component 10, as shown in FIG. 11, may be substantially similar to process P4 discussed herein with respect to FIG. 6.

Additionally as shown in FIG. 11, once sacrificial cap 100 is removed from body portion 12, body portion 12 alone may undergo at least one additional post-build process. In the non-limiting example, body portion 12 may undergo a recrystallization process, where the material forming body portion 12 may be recrystallized. Additionally in the non-limiting example, and as discussed herein, the process of recrystallization may impart no undesired tensile stress on body portion 12 whether component 10 includes sacrificial cap 100 or not. As such, sacrificial cap 100 may be removed after the shot peening process (see, FIG. 10), but before the recrystallization process. Performing the additional post-build process on body portion 12 after removing sacrificial cap 100, as shown in FIG. 11, may be substantially similar to (optional) process P5 discussed herein with respect to FIG. 6.

FIG. 12 shows a schematic/block view of an illustrative computerized metal powder additive manufacturing system 900 (hereinafter 'AMS 900') for generating an object(s) 902, which may include one large object or multiple objects, e.g., two objects 902A, 902B as shown, of which only a single layer is shown. Objects 902 discussed herein with respect to AMS 900 in FIG. 12 may be understood to be substantially similar and/or equivalent to component 10 including body portion 12 and sacrificial cap 100 shown in FIGS. 1-5 and 7-11. The teachings of the disclosures will be described relative to building object(s) 902 using multiple irradiation devices, e.g., four lasers 910, 912, 914, 916, but it is emphasized and will be readily recognized that the teachings of the disclosure are equally applicable to build multiple object(s) 902 using any number of irradiation devices, i.e., one or more. In this example, AMS 900 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. Object(s) 902 are illustrated as rectangular elements; however, it is understood that the additive manufacturing process can be readily adapted to manufacture any shaped object, a large variety of objects and a large number of objects on a build platform 18.

AMS 900 generally includes a metal powder additive manufacturing control system 920 ("control system") and an AM printer 922. As will be described, control system 920 executes object code 924O to generate object(s) 902 using multiple irradiation devices 910, 912, 914, 916. In the example shown, four irradiation devices may include four lasers. However, the teachings of the disclosures are applicable to any irradiation device, e.g., an electron beam, laser, etc. Control system 920 is shown implemented on computer 926 as computer program code. To this extent, computer 926 is shown including a memory 930 and/or storage system 932, a processor unit (PU) 934, an input/output (I/O) interface 936, and a bus 938. Further, computer 926 is shown in communication with an external I/O device/resource 940 and storage system 932. In general, processor unit (PU) 934 executes computer program code 924 that is stored in memory 930 and/or storage system 932. While executing computer program code 924, processor unit (PU) 934 can read and/or write data to/from memory 930, storage system 932, I/O device 940 and/or AM printer 922. Bus 938 provides a communication link between each of the objects in computer 926, and I/O device 940 can comprise any device that enables a user to interact with computer 926 (e.g., keyboard, pointing device, display, etc.). Computer 926 is only representative of various possible combinations of hardware and software. For example, processor unit (PU) 934 may comprise a single processing unit, or be distributed across one or more processing units in one or more locations, e.g., on a client and server. Similarly, memory 930 and/or storage system 932 may reside at one or more physical locations. Memory 930 and/or storage system 932 can comprise any combination of various types of non-transitory computer readable storage medium including magnetic media, optical media, random access memory (RAM), read only memory (ROM), etc. Computer 926 can comprise any type of computing device such as an industrial controller, a network server, a desktop computer, a laptop, a handheld device, etc.

As noted, AMS 900 and, in particular control system 920, executes program code 924 to generate object(s) 902. Program code 924 can include, inter alia, a set of computer-executable instructions (herein referred to as 'system code 924S') for operating AM printer 922 or other system parts, and a set of computer-executable instructions (herein referred to as 'object code 924O') defining object(s) 902 to be physically generated by AM printer 922. As described herein, additive manufacturing processes begin with a non-transitory computer readable storage medium (e.g., memory 930, storage system 932, etc.) storing program code 924. System code 924S for operating AM printer 922 may include any now known or later developed software code capable of operating AM printer 922.

Object code 924O defining object(s) 902 may include a precisely defined 3D model of an object and can be generated from any of a large variety of well-known computer aided design (CAD) software systems such as AutoCAD®, TurboCAD®, DesignCAD 3D Max, etc. In this regard, object code 924O can include any now known or later developed file format. Furthermore, object code 924O representative of object(s) 902 may be translated between different formats. For example, object code 924O may include Standard Tessellation Language (STL) files which was created for stereolithography CAD systems, or an additive manufacturing file (AMF), which is an international standard that is an extensible markup-language (XML) based format designed to allow any CAD software to describe the shape and composition of any three-dimensional object to be fabricated on any AM printer. Object code 924O representative of object(s) 902 may also be converted into a set of data signals and transmitted, received as a set of data signals and converted to code, stored, etc., as necessary. In any event, object code 924O may be an input to AMS 900 and may come from a part designer, an intellectual property (IP) provider, a design company, the operator or owner of AMS 900, or from other sources. In any event, control system 920 executes system code 924S and object code 924O, dividing object(s) 902 into a series of thin slices that assembles using AM printer 922 in successive layers of material.

AM printer 922 may include a processing chamber 942 that is sealed to provide a controlled atmosphere for object(s) 902 printing, e.g., a set pressure and temperature for lasers, or a vacuum for electron beam melting. A build platform 18, upon which object(s) 902 is/are built, is positioned within processing chamber 942. A number of irradiation devices 910, 912, 914, 916 are configured to melt layers of metal powder on build platform 18 to generate object(s) 902. While four irradiation devices 910, 912, 914, 916 will be described herein, it is emphasized that the teachings of the disclosure are applicable to a system employing any number of sources, e.g., 1, 2, 3, or 5 or more.

As shown in FIG. 12, an applicator 964 may create a thin layer of raw material 966 spread out as the blank canvas from which each successive slice of the final object will be created. Applicator 964 may move under control of a linear transport system 968. Linear transport system 968 may include any now known or later developed arrangement for moving applicator 964. In one embodiment, linear transport system 968 may include a pair of opposing rails 970, 972 extending on opposing sides of build platform 18, and a linear actuator 974 such as an electric motor coupled to applicator 964 for moving it along rails 970, 972. Linear actuator 974 is controlled by control system 920 to move applicator 964. Other forms of linear transport systems may also be employed. Applicator 964 take a variety of forms. In one embodiment, applicator 964 may include a member 976 configured to move along opposing rails 970, 972, and an actuator element (not shown in FIG. 12) in the form of a tip, blade or brush configured to spread metal powder evenly over build platform 18, i.e., build platform 18 or a previously formed layer of object(s) 902, to create a layer of raw material. The actuator element may be coupled to member 976 using a holder (not shown) in any number of ways. The process may use different raw materials in the form of metal powder. Raw materials may be provided to applicator 964 in a number of ways. In one embodiment, shown in FIG. 12, a stock of raw material may be held in a raw material source 978 in the form of a chamber accessible by applicator 964. In other arrangements, raw material may be delivered through applicator 964, e.g., through member 976 in front of its applicator element and over build platform 18. In any event, an overflow chamber 979 may be provided on a far side of applicator 964 to capture any overflow of raw material not layered on build platform 18. In FIG. 12, only one applicator 964 is shown. In some embodiments, applicator 964 may be among a plurality of applicators in which applicator 964 is an active applicator and other replacement applicators (not shown) are stored for use with linear transport system 968. Used applicators (not shown) may also be stored after they are no longer usable.

In one embodiment, object(s) 902 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). In another example, the metal may include practically any reactive metal such as but not limited to those known under their brand names: IN738LC, Rene 108, FSX 414, X-40, X-45, MAR-M509, MAR-M302 or Merl 72/Polymet 972.

The atmosphere within processing chamber 942 is controlled for the particular type of irradiation device being used. For example, for lasers, processing chamber 942 may be filled with an inert gas such as argon or nitrogen and controlled to minimize or eliminate oxygen. Here, control system 920 is configured to control a flow of an inert gas mixture 980 within processing chamber 942 from a source of inert gas 982. In this case, control system 920 may control a pump 984, and/or a flow valve system 986 for inert gas to control the content of gas mixture 980. Flow valve system 986 may include one or more computer controllable valves, flow sensors, temperature sensors, pressure sensors, etc., capable of precisely controlling flow of the particular gas. Pump 984 may be provided with or without valve system 986. Where pump 984 is omitted, inert gas may simply enter a conduit or manifold prior to introduction to processing chamber 942. Source of inert gas 982 may take the form of any conventional source for the material contained therein, e.g. a tank, reservoir or other source. Any sensors (not shown) required to measure gas mixture 980 may be provided. Gas mixture 980 may be filtered using a filter 988 in a conventional manner. Alternatively, for electron beams, processing chamber 942 may be controlled to maintain a vacuum. Here, control system 920 may control a pump 984 to maintain the vacuum, and flow valve system 986, source of inert gas 982 and/or filter 988 may be omitted. Any sensors (not shown) necessary to maintain the vacuum may be employed.

A vertical adjustment system 990 may be provided to vertically adjust a position of various parts of AM printer 922 to accommodate the addition of each new layer, e.g., a build platform 18 may lower and/or chamber 942 and/or applicator 964 may rise after each layer. Vertical adjustment system 990 may include any now known or later developed linear actuators to provide such adjustment that are under the control of control system 920.

In operation, build platform 18 with metal powder thereon is provided within processing chamber 942, and control system 920 controls the atmosphere within processing chamber 942. Control system 920 also controls AM printer 922, and in particular, applicator 964 (e.g., linear actuator 974) and irradiation device(s) 910, 912, 914, 916 to sequentially melt layers of metal powder on build platform 18 to generate object(s) 902 according to embodiments of the disclosure. As noted, various parts of AM printer 922 may vertically move via vertical adjustment system 990 to accommodate the addition of each new layer, e.g., a build platform 18 may lower and/or chamber 942 and/or applicator 964 may rise after each layer.

Technical effect is to provide an intermediate, additive manufactured component including a sacrificial cap that may substantially minimize and/or eliminate tensile stress within a body portion of the component during build processes.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data. It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An additive manufactured component, the component comprising:
   a body portion including a first surface;
   a feature formed in the body portion, the feature including an aperture formed through the first surface of the body portion; and
   a sacrificial cap formed integral with at least a portion of the first surface of the body portion, the sacrificial cap including:
     a conduit in fluid communication with the feature, the conduit including:
       a first opening in direct fluid communication with the aperture of the feature, and
       a second opening formed opposite the first opening and exposed on a surface of the sacrificial cap, the second opening in fluid communication with the first opening via the conduit,
   wherein the sacrificial cap including the conduit is configured to be removed from the body portion to expose the first surface and the aperture of the feature;
   wherein the feature includes one of:
     a channel formed through the body portion, or
     a recess formed partially through the body portion;
   wherein the channel includes a distinct aperture formed through one of:
     the first surface of the body portion, or
     a second surface of the body portion, the second surface distinct form the first surface; and
   further comprising:
     a distinct sacrificial cap formed integral with at least a portion of the second surface of the body portion and covering the distinct aperture of the channel, the distinct sacrificial cap including a conduit in fluid communication with the distinct aperture.

2. The component of claim 1, wherein the conduit of the sacrificial cap forms a portion of a manifold in fluid communication with the feature.

3. An additive manufactured component, the component comprising:
   a body portion including a first surface;
   a feature formed in the body portion, the feature including an aperture formed through the first surface of the body portion; and
   a sacrificial cap formed integral with at least a portion of the first surface of the body portion, the sacrificial cap including:
     a conduit in fluid communication with the feature, the conduit including:
       a first opening in direct fluid communication with the aperture of the feature, and
       a second opening formed opposite the first opening and exposed on a surface of the sacrificial cap, the second opening in fluid communication with the first opening via the conduit, and
   wherein the sacrificial cap including the conduit is configured to be removed from the body portion to expose the first surface and the aperture of the feature; and
   further wherein:
     the body portion includes a first material density, and
     the sacrificial cap includes a second material density, the second material density less than the first material density.

4. An additive manufactured component, the component comprising:
   a body portion;
   a plurality of channels formed in the body portion, each of the plurality of channels including:
     a first aperture formed through a first surface of the body portion; and
     a second aperture formed through one of the first surface or a second surface of the body portion; and
   a sacrificial cap formed integral with at least a portion of the first surface of the body portion, the sacrificial cap including:
     a plurality of conduits, each of the plurality of conduits including a first opening in fluid communication with a corresponding channel of the plurality of channels, and
     a manifold in fluid communication with each of the plurality of channels, the manifold including:
       at least one second opening in fluid communication with the first opening of each of the plurality of conduits via the manifold, the at least one second opening exposed on a surface of the sacrificial cap,
   wherein the sacrificial cap is configured to be removed from the body portion to expose the first surface and the aperture of each of the plurality of channels, further including a recess formed on the first surface of the body portion.

5. The component of claim 4, wherein the sacrificial cap covers the second aperture of each of the plurality of channels formed on the first surface.

6. The component of claim 4, further comprising:
a distinct sacrificial cap formed integral with at least a portion of the second surface of the body portion and covering the second aperture of the channel, the distinct sacrificial cap including a conduit in fluid communication with the second aperture.

7. The component of claim 4, wherein the sacrificial cap covers the plurality of channels formed in the body portion.

8. The component of claim 4, wherein the sacrificial cap either:
covers the recess formed on the first surface of the body portion,
includes the plurality of conduits, one of the plurality of conduits in fluid communication with the recess, or
includes the manifold in fluid communication with the recess.

9. A method of forming a component using an additive manufacturing system, the method comprising:
building a body portion of the component directly on a build plate, the body portion including:
a feature formed in the body portion, the feature including an aperture formed through a surface of the body portion;
building a sacrificial cap directly on and integral with the surface of the body portion of the component, the sacrificial cap including a conduit in fluid communication with the feature;
performing at least one post-build process on the component including the body portion and the sacrificial cap; and
removing the sacrificial cap from the body portion of the component to expose the surface of the body portion and the aperture of the feature.

10. The method of claim 9, wherein building the sacrificial cap further comprises:
forming a first opening in direct fluid communication with the aperture of the feature; and
forming a second opening opposite the first opening, the second opening in fluid communication with the first opening via the conduit.

11. The method of claim 9, wherein performing the at least one post-build process on the component further comprises at last one of:
shot peening the sacrificial cap built directly on and integral with the surface of the body portion of the component, or
recrystallizing the component including the body portion and the sacrificial cap.

12. The method of claim 9, wherein building the sacrificial cap further comprises:
building the sacrificial cap to include a material density that is less than a material density of the body portion of the component.

13. The method of claim 9, wherein building the sacrificial cap further comprises:
covering the aperture of the feature formed in the body portion of the component.

* * * * *